(12) United States Patent
Baudisch et al.

(10) Patent No.: US 8,190,444 B2
(45) Date of Patent: May 29, 2012

(54) ONLINE PERSONAL APPEARANCE ADVISOR

(75) Inventors: Patrick Baudisch, Seattle, WA (US); Dan Liebling, Seattle, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 11/950,517

(22) Filed: Dec. 5, 2007

(65) Prior Publication Data
US 2009/0150203 A1    Jun. 11, 2009

(51) Int. Cl.
*G06Q 10/00* (2012.01)
(52) U.S. Cl. ....................................................... 705/1.1
(58) Field of Classification Search ...................... 705/10
See application file for complete search history.

(56) References Cited

U.S. PATENT DOCUMENTS

| | | | |
|---|---|---|---|
| 5,490,225 | A | 2/1996 | Kumagai |
| 6,295,559 | B1 | 9/2001 | Emens et al. |
| 6,301,388 | B1 | 10/2001 | Hiramoto |
| 7,127,164 | B1 | 10/2006 | Parulski et al. |
| 7,487,441 | B2* | 2/2009 | Szeto ............................ 715/234 |
| 7,589,847 | B2* | 9/2009 | Jurkowski et al. ........... 358/1.13 |
| 2003/0130035 | A1 | 7/2003 | Kanarat |
| 2007/0007340 | A1* | 1/2007 | Mugica et al. ................ 235/386 |
| 2008/0030496 | A1* | 2/2008 | Lee et al. ...................... 345/418 |

FOREIGN PATENT DOCUMENTS

JP    2001078178    *    3/2001

OTHER PUBLICATIONS

No author, Pictures2Rate, Nov. 26, 2007, website, 6 pages.*
"Attractive Face Scale", 2007.
"Photo Rating, Picture Rating, Hot or Not—Pictures2Rate.com", 2007 , Pictures2Rate.com.
"Cuteornot.com—Image Rating Website", 2004-2007 , cuteornot.com.
"RankMyPhotos", 2001-2007 , RankMyPhotos.com.
"Vote for My Photo!"
"Hot or Not", 2000-2007 , Eight Days, Inc.
"Rating Sites", retrieved at <<http://en.wikipedia.org/wiki/Rating_sites>>.
"Easy poll", 2006 , easy-poll.com.

* cited by examiner

*Primary Examiner* — Thomas Dixon

(57) ABSTRACT

Architecture for providing feedback to a viewer and/or contributor on fashion and other personal appearance decisions that the contributor desires. The contributor uploads self images for viewing and rating (or voting) by viewers who choose provide an opinion on different fashion and/or cosmetic looks of the contributor. The contributor takes images show the contributor presented with a number (e.g., two) of different fashion choices. The snapshots can then be processed for upload to a website or other accessible location by one or more viewers. The viewers can cast a vote for one of the images by selecting the desired image, in response to which the viewer and/or contributor will be presented with overall statistics for that set of images as to how other viewers voted, as well as a next set of photos depicting the user in a different fashion and/or cosmetic choice. This process can continue until terminated.

19 Claims, 10 Drawing Sheets

ONLINE PERSONAL APPEARANCE ADVISOR

BACKGROUND

The advent of global networks such as the Internet has made available enormous amounts of information not only in the form of static data but also for dynamic interaction with other systems and users. Users can now access information and other users to discuss and exchange views on virtually any topic and in realtime. Moreover, the fact that this exchange is interactive (reality-based) rather than a receive-only scenario provides immediate feedback. This is evidenced in an emerging trend in TV shows that provide technology for allowing viewers to vote on contestants in a variety of different competitions (e.g., singing, dancing, etc.).

Commercial enterprises have realized the potential in reaching millions of potential customers to conduct anonymous surveys to obtain demographics and other desired information in order to determine the type of advertising to present on websites, and so on. A website may present information (e.g., audio data, video data, image date, text, etc.) or questions to which users can take a few minutes to rate or answer in anonymity.

A variation on this model is also applied to rating websites where users can rate other on physical appearance, pets, personality and other user traits and attributes. In voting sites, typically, it is a general purpose question posed to viewers, and once the viewers have answered the question they tend to leave the website to do something else. In other rating websites, when viewers have rated an image, the viewers are presented with a seemingly endless series of other images to be rated or voted on, the purpose of which is to generate a flow experience so the viewers will stay at the website to continue participating. This process can generate revenue for advertisers by presenting advertisements while the viewers are voting. Moreover, there is a fascination with anonymously critiquing the appearance of another person.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides feedback to a user on fashion and other personal appearance decisions that the user may desire. The user can upload self images for viewing and rating (or voting) by viewers who choose provide an opinion on a set of images that depict the user in different fashion and/or cosmetic looks. For example, the user (or contributor) takes photo snapshots that show the user presented with a number (e.g., two) of different fashion choices. The snapshots can then be processed for upload to a website or other accessible location for viewing by one or more viewers. The viewers can cast a vote for one of the images by selecting the desired image (e.g., clicking on an image). In response, the viewer(s) and/or contributor will be presented with overall statistics for that set of images as to how other viewers voted, as well as a next set (e.g., pair) of photos depicting the user in different fashion and/or cosmetic choice. Alternatively, or in combination therewith, the viewer(s) will be presented a set of images of other users desiring to be voted on. This process can continue until terminated, based on the viewer not voting, the contributor no longer providing images for voting, scheduling information, and so on.

The viewer is enticed to continue with the voting process by streamlining the way in which contributor images are formatted and allowed to be uploaded and processed for presentation. Additionally, the viewer is enticed to continue participating by receiving statistics that indicate how the viewer compares to other viewer opinions. For example, the statistics can be obtained via users and/or groups of users of a social network that may have similar interests. The statistics and new set of images are quickly presented to the viewer to optimize viewer participation by reducing delay in providing the feedback to the viewer. Other enticements can be provided such as rewards, points, content, discounts, etc., that serve to maintain viewer participation.

The contributor can also select a specific set of viewers rather than allowing public access to the viewer feedback process. For example, if the contributor values one viewer opinion over another, the viewer with the valued opinion can be selected and notified for a voting opinion.

In a broader implementation, the contributor can upload images or other types of media (e.g., video files, audio files, etc.) related to non-fashion content for viewing and voting by other viewers. For example, the contributor can upload images of automobiles for viewing and voting by the viewers.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
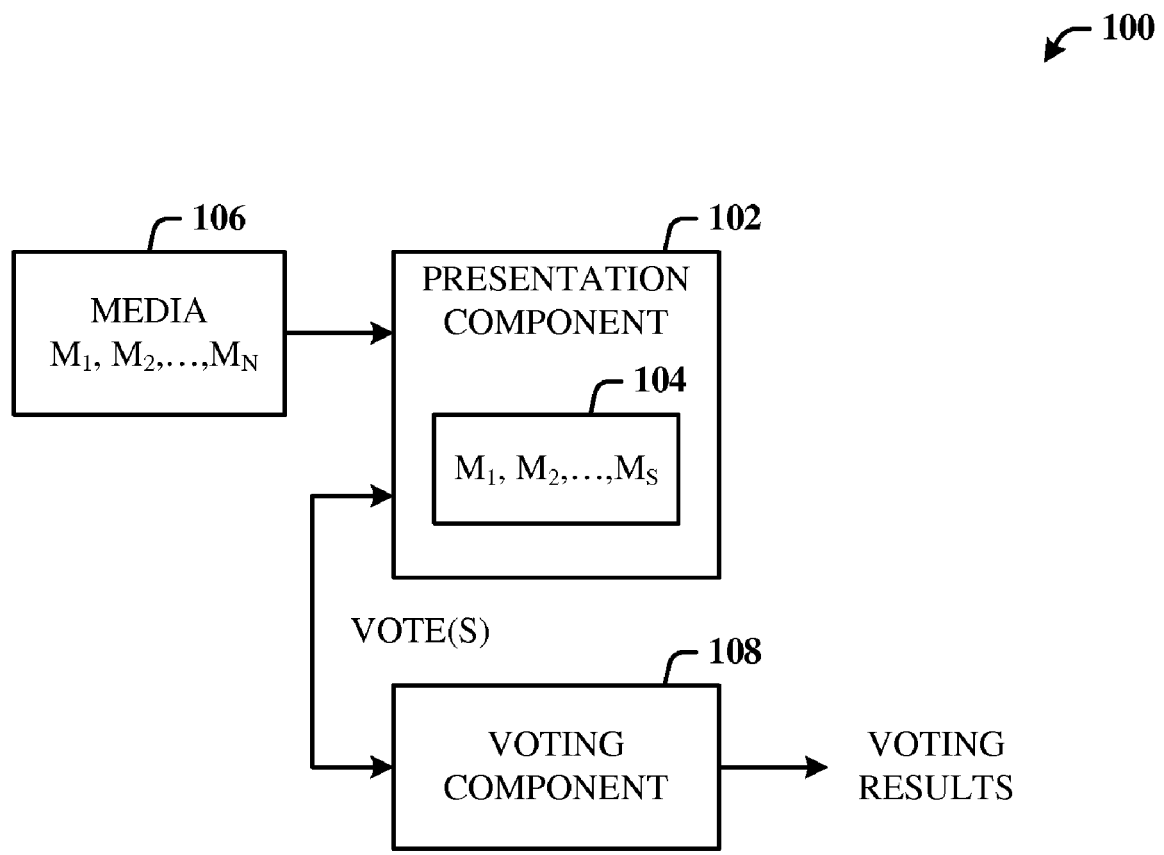
FIG. 1 illustrates a computer-implemented system for providing feedback on personal appearance.

The disclosed architecture includes the capability to function as, in one implementation, an online fashion advisor by helping users to decide what to wear and/or how to make cosmetic changes in user appearance. Unlike other services that compare/contrast images of other users, the architecture provides a user the capability to upload images of himself or herself for comparing and contrasting in personal appearance decisions (e.g., fashion decisions, which shirt to wear, what hairstyle to choose, etc.). Users can use this service on an ad-hoc basis to answer a fashion-related question or for receiving viewer votes related to other types of non-fashion content. A more generalized implementations can facilitate the upload and voting (or rating) of other user media in the form of audio clips, video clips, text, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for providing feedback on personal appearance or other contributor content. Although described herein in the context of personal appearance content, it is to be understood that the disclosed architecture can accommodate content submitted by the contributor for viewer feedback of any kind (e.g., objects, artwork, poems, vocal style, etc.) and in many different media formats (e.g., audio file, video file, images, text, etc.). The system 100 can include a presentation component 102 for receiving and presenting a subset of media 104 (denoted $M_1$, $M_2, \ldots, M_S$) from a set of media 106 (denoted $M_1, M_2, \ldots, M_N$) of a contributor (or user) for voting by other viewers. The set of media 106 can be associated with personal appearance information of the contributor. In other words, the contributor can upload photographic images or digitally enhanced images that depict the contributor in different instance of cosmetic appearance such as different hair color, hair style, different makeup, and/or difference instances of clothing or other apparel, for example. It is to be understood that other types of user appearance can also be captured and uploaded for viewer feedback. The subset of media 104 is then presented to one or more other viewers.

A voting component 108 is provided for receiving and processing votes generated by the one or more viewers, the votes registered from the viewers selecting one of the subset of media 104. In other words, if a viewer prefers the appearance of the contributor in a particular hairstyle relative to another instance of presented hairstyle, the viewer selects the media ($M_s$) associated with the preferred appearance and this selection is then registered as a vote for that associated appearance.

The voting component 108 presents new media from the set of media 106 to the viewer in response to receiving the vote. The new media can also be associated with new personal appearance information of the contributor. For example, once the viewer votes on the preferred hairstyle, the system 100 automatically replaces the existing subset of media 104 with a new set of media to be voted on. These new media can include a minor content change such as a color of lipstick that complements the previously-selected hairstyle, a set of glasses to be worn with the previously-selected hairstyle, a shirt or top to be worn with the previously-selected hairstyle, and so on.

As previously indicated, the contributor can manually apply the lipstick, take a photograph, manually apply a different color lipstick, take a photograph, and then upload both photographs as the set of media 106 for selection and presentation. Alternatively or in combination therewith, the contributor can use software to digitally alter or enhance (e.g., paint) the lipstick colors on an image of the contributor for uploading and presentation as the media.

In one embodiment, the subset of media 104 are selected and presented as a pair of images, each image depicting a different instance of related personal appearance information (or other content) and each image selectable by the viewer to provide the vote. This can be differentiated by a single change in the personal appearance information or multiple changes in appearance. The voting component 108 processes the vote(s) received from the viewer(s) and sends voting results to the contributor and/or the other viewers. In one embodiment related to privacy concerns, the voting results can be sent to a location that allows access only to the contributor.

Figure 2:
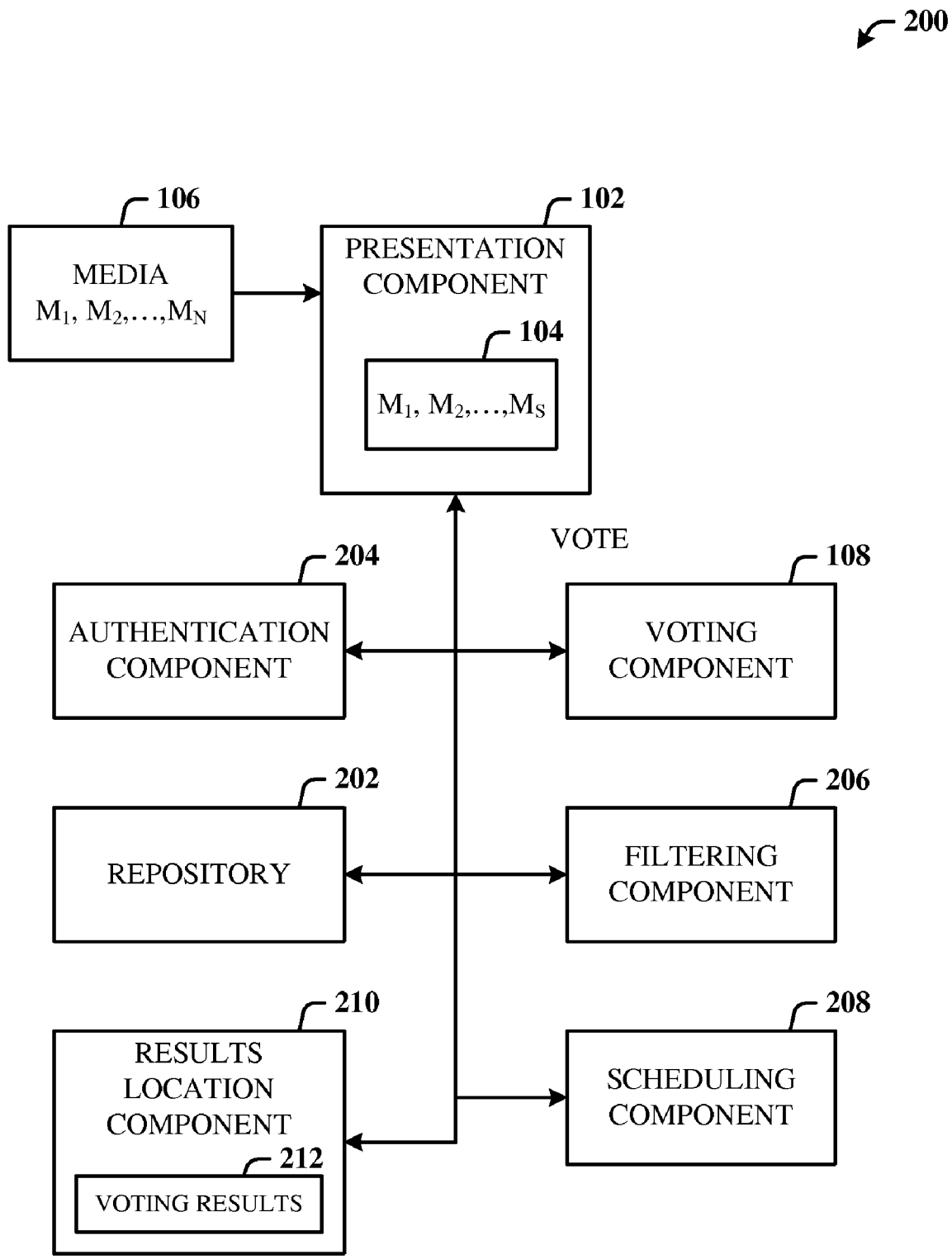
FIG. 2 illustrates an alternative system for providing feedback on personal appearance.

FIG. 2 illustrates an alternative system 200 for providing feedback on personal appearance. The system 200 includes the presentation component 102 and voting component 108 of FIG. 1, as well as other component such as a repository 202 for storing the contributor media. In other words, the contributor can upload the media for storage such that when the system 200 operates, all of the desired set of media 106 is readily available by the system 200 for automatic selection, presentation, and vote processing of the subset of the media 104. The repository 202 can be located local to a website that supports the disclosed feedback system and/or local to a user client such that the user can generate the media locally and upload the media as a batch, for example.

In order to provide some level of security for the contributor media stored in the repository 202 and/or for access to the media via a remote location (e.g., a website), the system 200 can include an authentication component 204 that prompts the accessing user for security information before allowing access. Thus, access to the media can be managed to prevent unfettered access by all pre-designated viewers, although public access can also be provided.

A filtering component 206 allows the contributor to limit the viewers for a voting session. For example, rather than allow public access to the viewing and voting process for a given set of media 104, the contributor can limit the viewers to a finite set of viewers, for example, only viewers the contributor deems knowledgeable about a certain aspect of which the contributor wants feedback, only viewers that the contributor knows, only viewers the contributor does not know, only viewers associated with a social network, only viewers associated with a certain demographic attribute (e.g., age group between 19 and 30 years old), and so on. The filtering component 206 also can be configured to send notifications to only those viewers that the contributor wants to view the impressions. Thus, the selected viewers can receive messages by cell phone, text messages, email, and other conventional forms of communications.

A scheduling component 208 allows the contributor to schedule when the media are to be presented to the viewers and how long the media should be presented. For example, if the contributor is in a hurry, the time for viewing and response can be limited to a predetermined duration of time (e.g., thirty minutes), or based on an ending time (e.g., only votes accepted up to 6 PM), or a combination of start time and duration (e.g., beginning at 3 PM for a duration of three hours).

The scheduling component 208 can accommodate the entry of timing information in many different ways. For example, scheduling parameters can be provided for a given set of media such as thirty minutes for receiving votes for hair color, and two hours for receiving votes for media related to the type of shirt to be worn with the hair color. Moreover, once the votes are collected for both hair color and the type of shirt, a confirmation session can be initiated that combines both the hair color and selected shirt for viewing and feedback.

This can also be made a cumulative process where once the viewers vote on hair color, the next set of media that request feedback on shirt color can automatically present the previously selected hair color in the media for the shirt color.

The system 200 can also include a results location component 210 for sending the voting results 212 to the desired location for review by the contributor. For example, the results 212 can be emailed to the contributor for reviewing the feedback of all participating viewers. Alternatively, the results 212 can be sent to a website to which the contributor is directed using a URL (uniform resource locator) or other conventional location string for login and viewing the results.

It is to be understood that media is intended to include media that can be viewed (e.g., images, video), heard (e.g., audio files), and text (e.g., for poems, grammar review, etc.). In other words, viewer feedback can be employed for many different types of content information that the contributor chooses for feedback.

Figure 3:
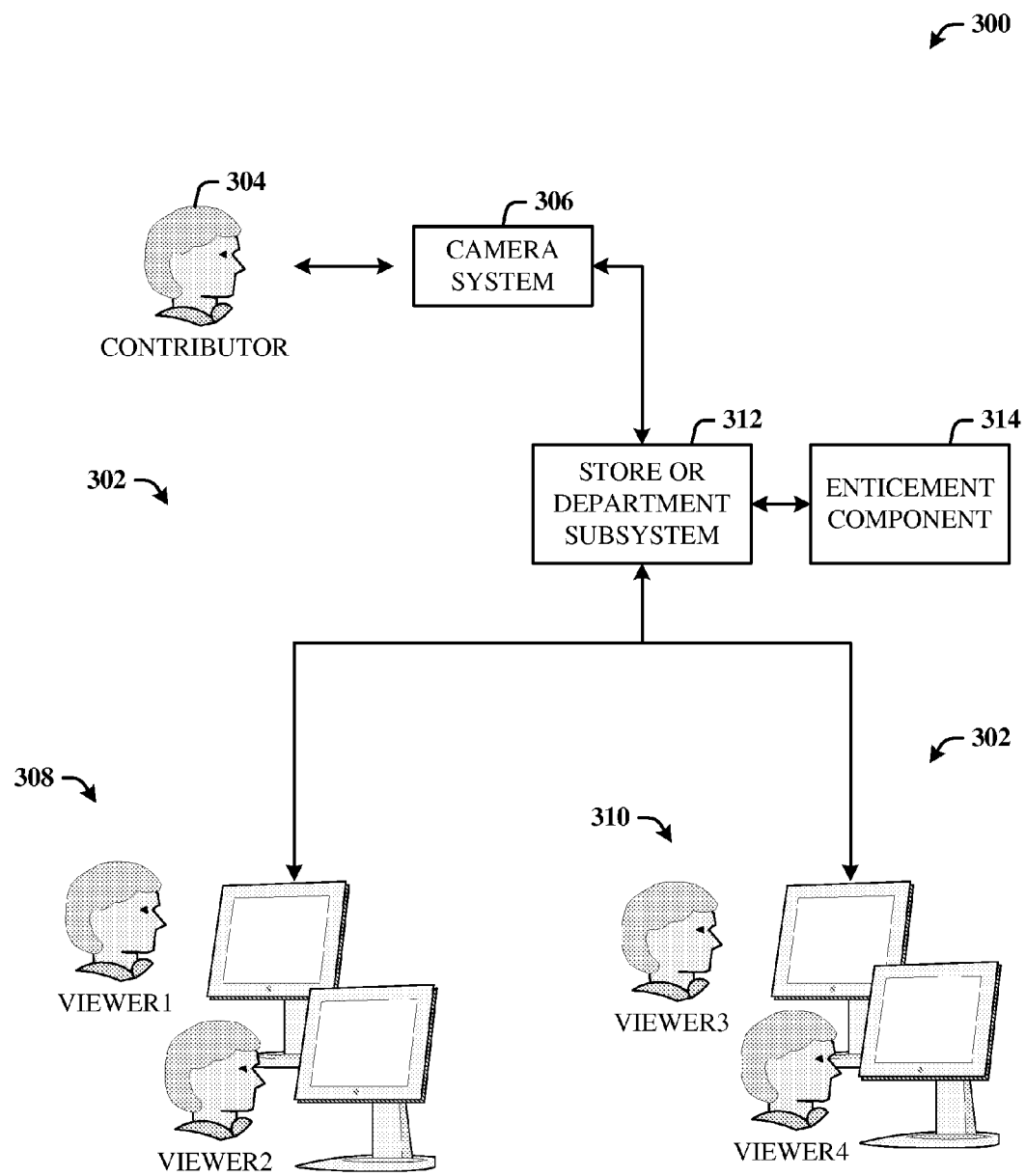
FIG. 3 illustrates an in-store system where viewers can vote on apparel choices of a customer contributor.

FIG. 3 illustrates an in-store system 300 where viewers 302 can vote on apparel choices of a customer contributor 304. The system 300 can include a camera system 306 that takes images of the contributor 304 in different apparel settings for upload and viewing by the viewers 302. The viewers 302 can include only in-store customer viewers 308, remote viewers 310 (external to the store) or a combination of in-store and remote viewers. The system 300 can include a store (or department) subsystem 312 which operates to provide the capabilities described in this store context. The store subsystem 312 can also be implemented on a departmental basis (e.g., clothing department(s), cosmetics department, hair salon, etc.) or other departments or environments where a contributor desires independent feedback.

The system 300 can also include an enticement component 314 for enticing viewers (e.g., in-store, online) to participate by voting on the images of the contributor 304 presented. The enticements can include rewards, discounts, third-party offerings, inter-departmental discount offerings, and so on. The store subsystem 312 can further allow the contributor 304 to set the time for disabling voting given that the contributor may desire a voting decision be relatively immediately, in a few hours before leaving the store, or within the next few days, in which case the contributor can come back and choose the desire apparel, cosmetics, hair style, etc.

In yet another embodiment, the contributor customer can shop for the desired apparel, take a single personal image via the camera system 306, and have the images of the selected apparel superimposed on the personal image for voting by other viewers (in-store and/or remote).

In all cases, the voting results can be received and presented to the contributor at the store via a store monitor (e.g., via a login), sent to a portable device (e.g., cell phone, PDA, etc.) of the contributor (that the contributor may be carrying) and/or have the results sent to a home computer system, for example.

Additionally, as described above, when a viewer votes on a particular set of images having different but related instances of personal appearance items, the store subsystem 312 will automatically select and present another set of images for viewing and voting.

Although described up to this point in the context of voting (e.g., yes or no), it is within contemplation of the subject architecture that the viewers could be presented with a rating system that allows the viewer to rate the images (or impressions) according to a graduated scale (e.g., 1-10). Once the viewer enters or selects a rating value for each or a predetermined number of the presented images, the system 300 will automatically remove and replace the view with another set of images (or impressions) to be rated.

The system 300 can be implemented to not only provide the voting feedback, but also to monitor demographics about the contributor as well as the viewers. For example, by tracking and storing voting results, the store can receive information about likes and dislikes of products currently being offered, or about which could be offered. Moreover, based on voting results, the store can configure the subsystem 312 to present advertisements of related apparel, for example, that is similar to the selected apparel the contributor wishes to receive votes, or on sale, or soon to be a seasonal product shipped in for sale.

Figure 4:
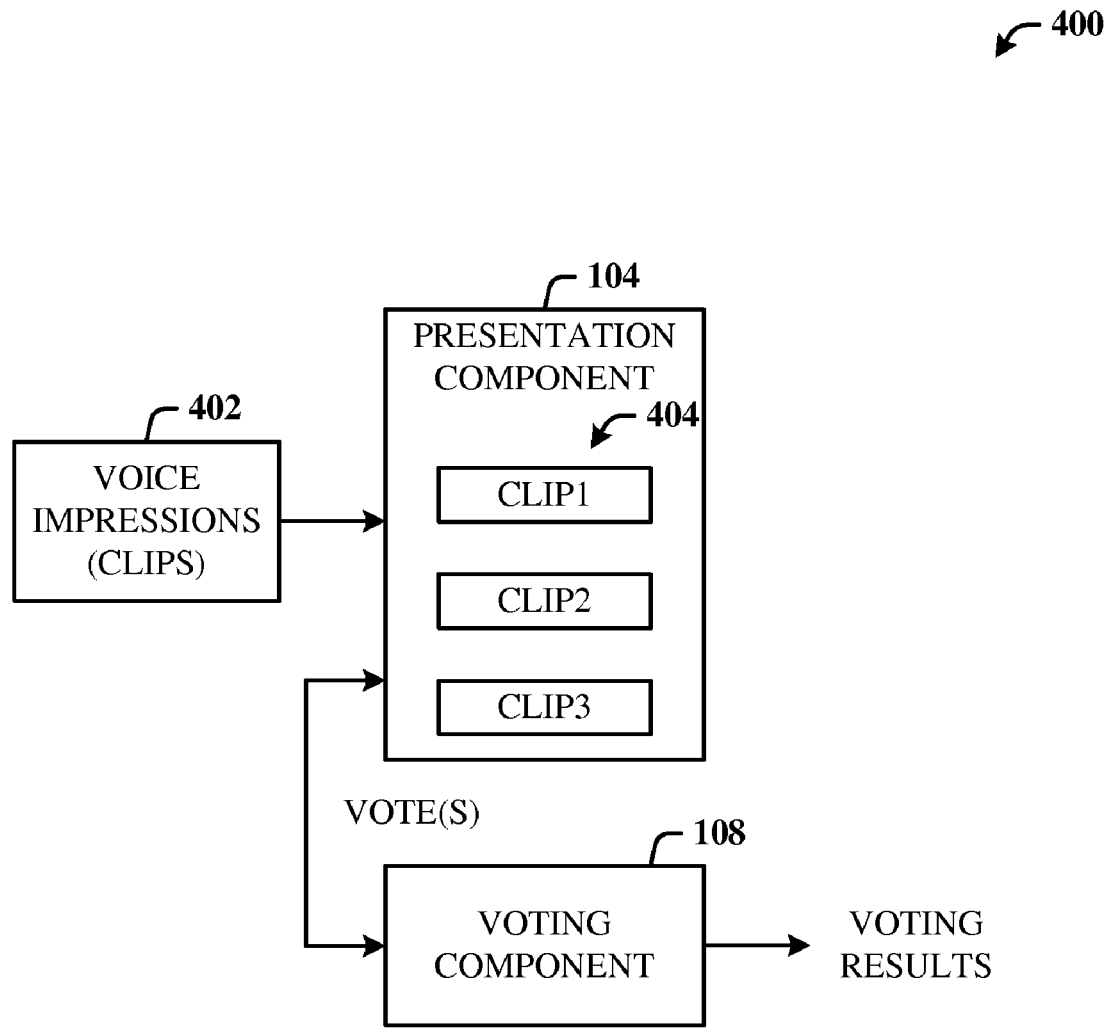
FIG. 4 illustrates a system that facilitates voting on contributor voice clips (or impressions).

FIG. 4 illustrates a system 400 that facilitates voting on contributor voice clips (or media). As previously described, the contributor can create and upload different types of media for the voting process. Here, the contributor creates voice clips (or media) 402 from which can be selected a subset 404 for presenting (playback) and voting by other listeners. The presented voice clips 404 can be short clips of singing by the contributor, enunciations, readings, etc., which can be voted on by the listeners. In one example, the contributor creates and uploads a first set of voice song files such as soft tunes that when voted on, is automatically replaced by a new set of voice song files of rock music clips sung by the contributor, followed by another genre of voiced songs.

In another embodiment, the input media are a mix of media types from which are selected and present the contributor in a set of apparel, cosmetics, etc., while the song clips are being played back for voting, or while the readings are being played back to present a richer voting experience. For example, an image can have the contributor dressed in black leather while singing a hard rock clip and having orange hair versus the contributor dressed in soft colors, reading lines of poetry and in purple hair. Voting can be for any number of the attributes or characteristics of the presented media, with voting results fed back to the contributor by one or more conventional communications means.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
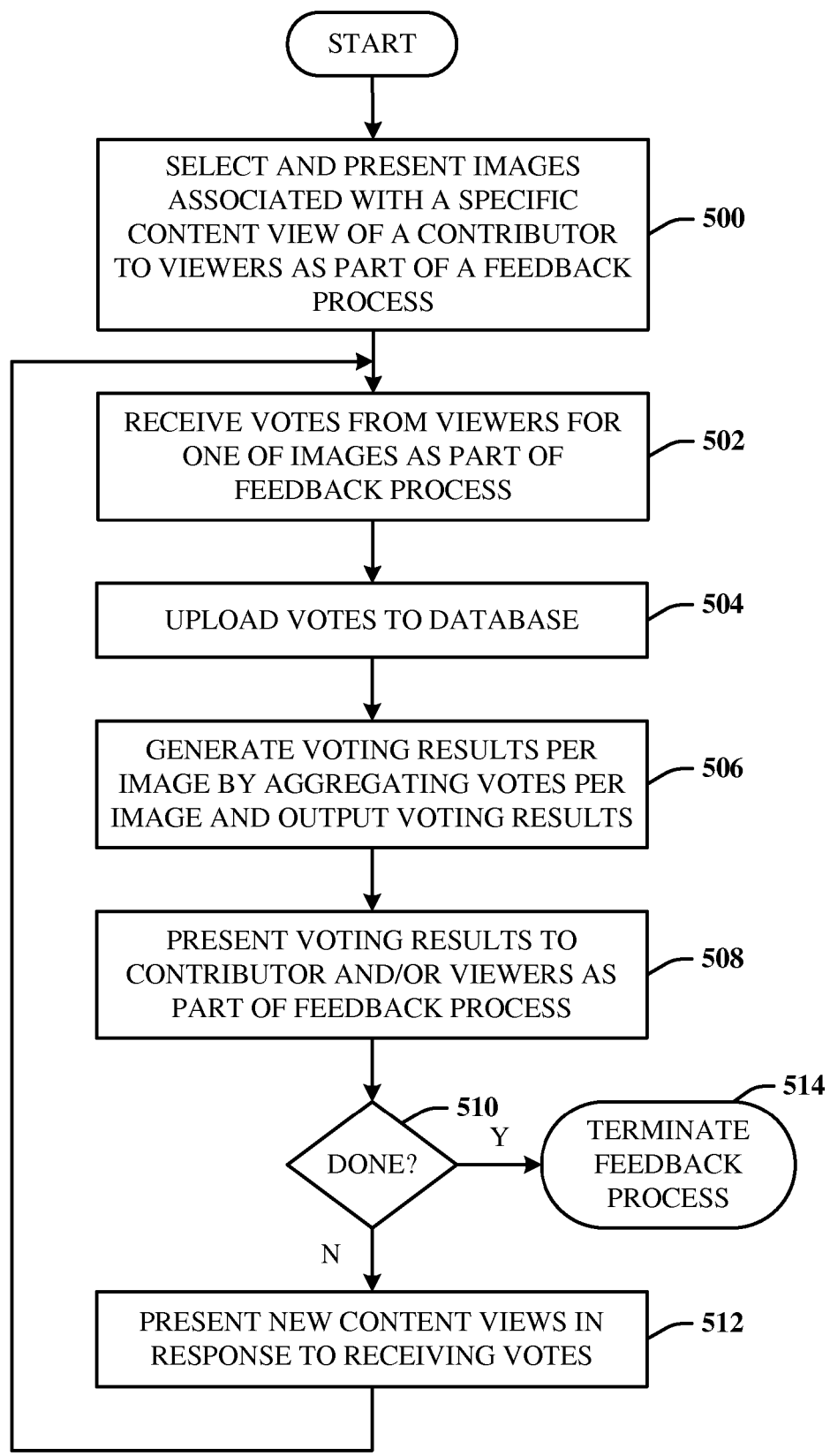
FIG. 5 illustrates a method of providing feedback for content submitted by a contributor.

FIG. 5 illustrates a method of providing feedback for content submitted by a contributor. At 500, images associated with a specific content view of contributor are selected and presented to viewers as part of a feedback process. At 502, votes are received from the viewers for one of the images as part of the feedback process. At 504, the votes are uploaded to a database. At 506, voting results are generated by aggregating the votes on a per-image basis, and the voting results are output. At 508, the voting results are presented to the contributor and/or viewers as part of the feedback process. At 510, if the feedback process has not completed, flow continues to 512 to select and present new content views to the viewers in response to receiving the votes. Flow is then back to 502 to continue receiving and processing votes, and so on.

Alternatively, at 510, if the voting process has completed, flow is to 514 to terminate the feedback process.

Figure 6:
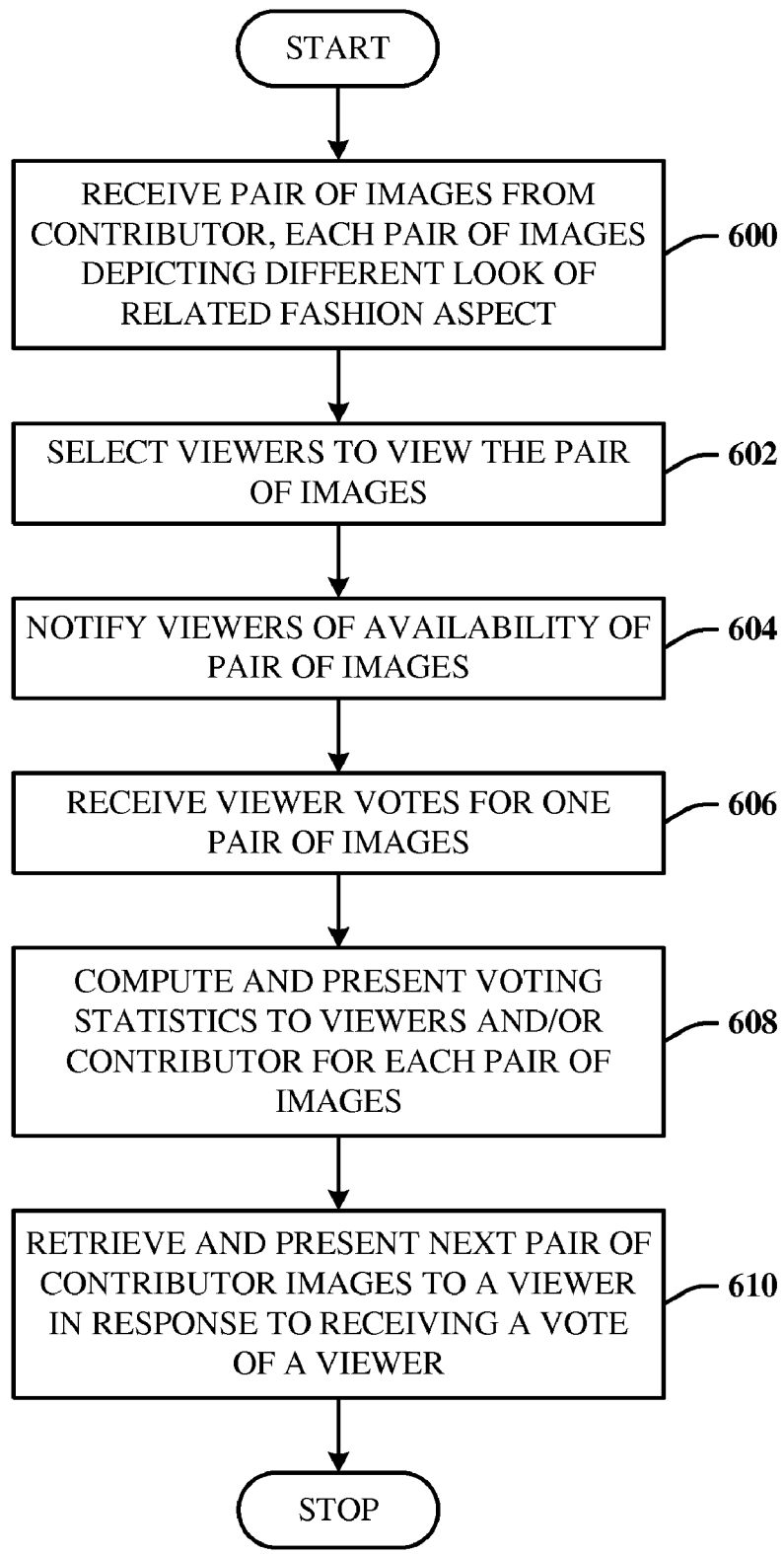
FIG. 6 illustrates a method of processing contributor image pairs for fashion feedback.

FIG. 6 illustrates a method of processing contributor image pairs for fashion feedback. At 600, a pair of images is received from a contributor, each pair of images depicting a different look related to a fashion aspect. At 602, one or more viewers are selected to view the pair of images. At 604, the selected viewers are notified of the availability of the pair of images. At 606, the viewer votes for the pair of images are received. At 608, voting statistics are computed and presented to the viewers and/or contributor for each pair of images. At 610, a next pair of images is retrieved and presented in response to receiving a vote from the viewer. Note that this occurs separately for each viewer.

Figure 7:
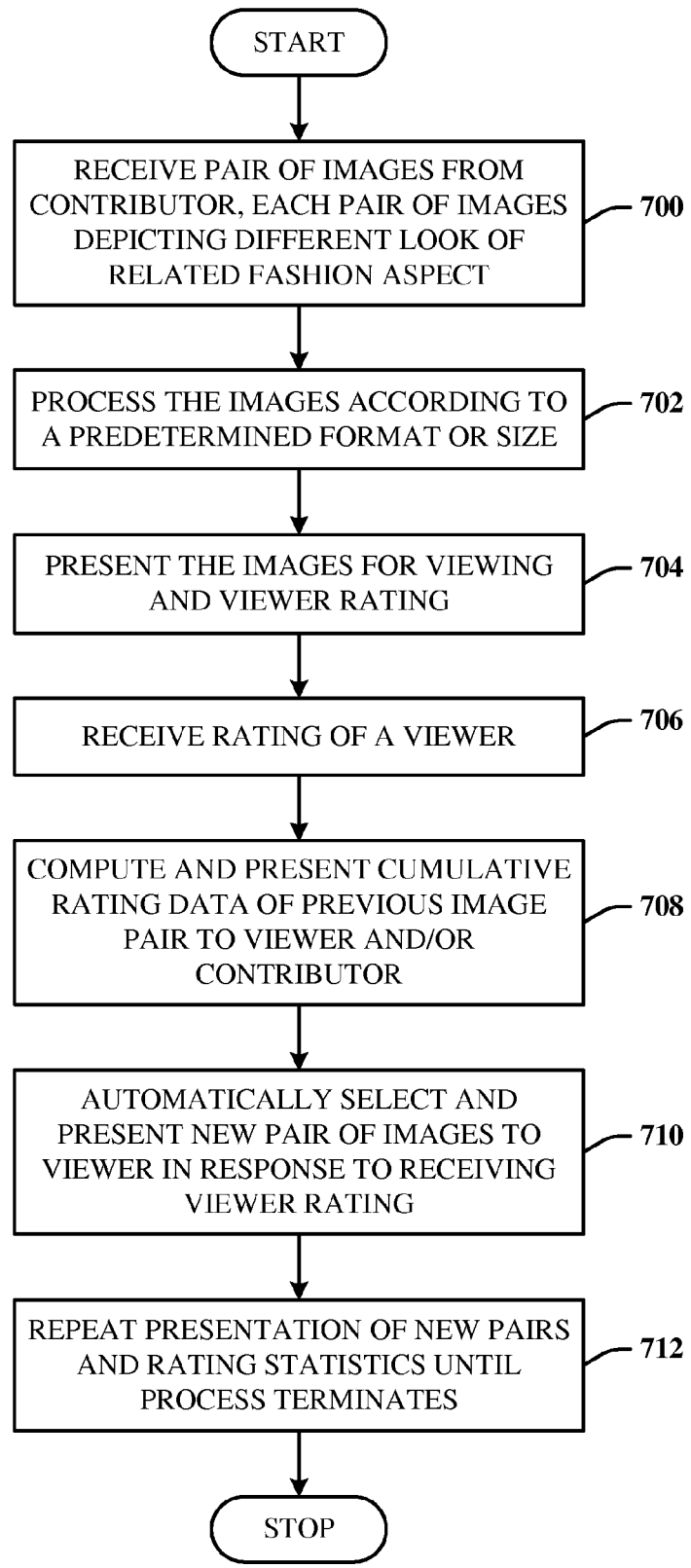
FIG. 7 illustrates a method of managing image input properties for expedient system handling and throughput for the viewers.

FIG. 7 illustrates a method of managing image input properties for expedient system handling and throughput for the viewers. At 700, a pair of images is received from a contributor, each pair of images depicting a different look of a related fashion aspect. In other words, both images are related to a change in hair color—one image showing the contributor in black hair and the other image showing the contributor in blue hair. At 702, the received images are processed to a predetermined format and size. Alternatively, the system can process the images, but then notify the contributor that the format and/or size may exceed that which is allowed. This ensures that the system can handle and present the images quickly and according to the known format and size. This further facilitates accommodating the viewer desire to more quickly move through the images (or impressions), thereby maintaining the viewer interest. At 704, the images are presented for viewing and rating. Here, the viewer can rate the images, rather than simply voting (e.g., yes or no). A graduated scale (e.g., 1-10 selectable values) can be presented for each image, or only for the selected image which the viewer can then rate. In another embodiment, the viewer votes for one of the two images, and then is presented with a ratings scale to rate the selected image on a scale of 1-10.

At 706, the system receives the viewer rating. At 708, in response to receiving the viewer rating, the cumulative ratings statistics are computed and presented to the viewer and/or contributor. It is to be understood that in addition to quickly presenting the rating statistics about other viewers so that the viewer can receive feedback about his/her opinion relative to other viewers, the system can augment the statistics with other content to entice the viewer to continue with the ratings process. At 710, in response to the system receiving the viewer rating, a new pair of contributor images is selected by the system and presented. This new pair of images can be of the contributor in two different sets of eye glasses, for example, of which the viewer can select a preferred appearance. At 712, the presentation of new pairs of images and ratings statistics continues until the process terminates. Termination can be due to the viewer's lack of interaction within a scheduled time period, for example.

Figure 8:
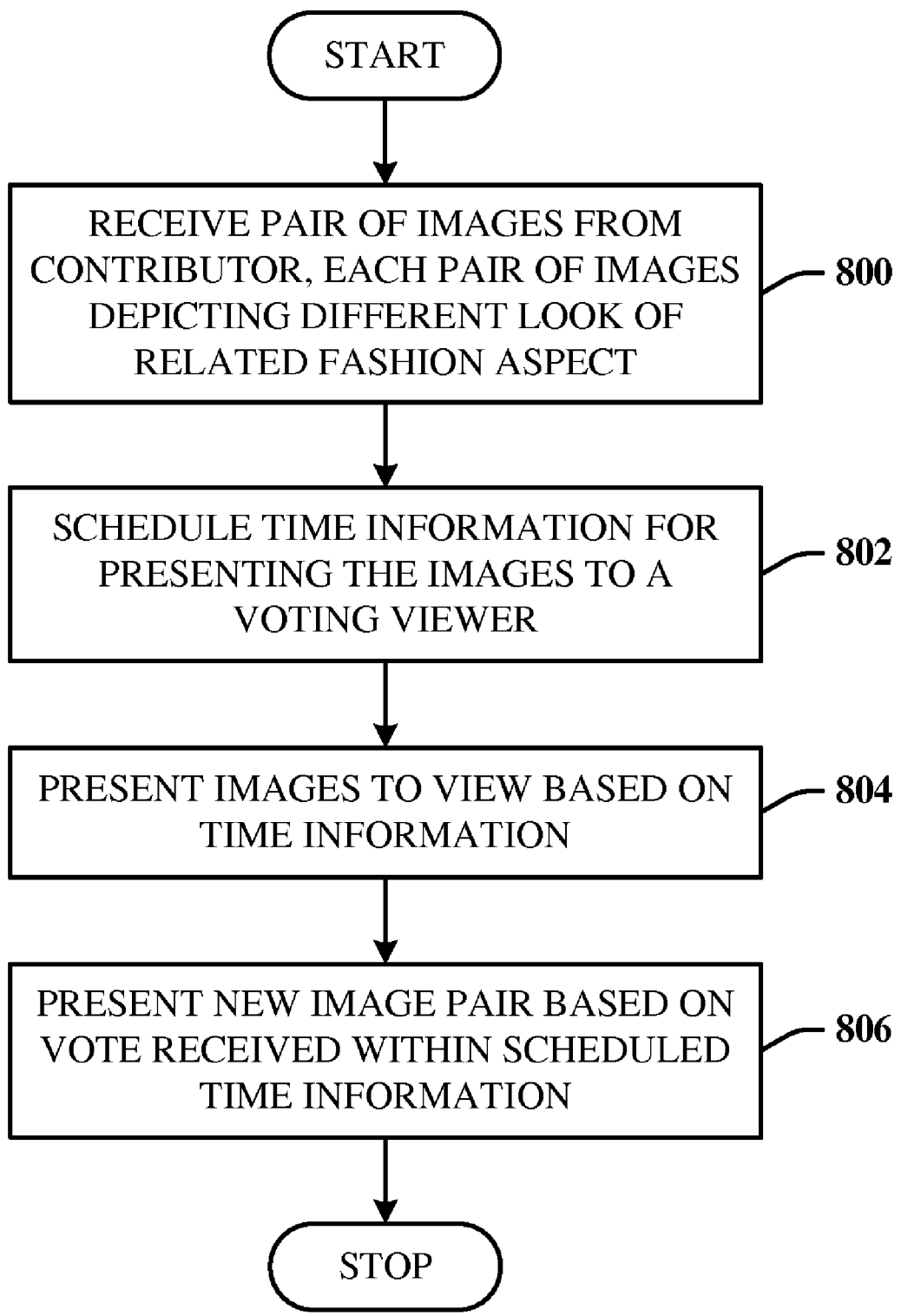
FIG. 8 illustrates a method of managing image presentation and viewer feedback based on scheduling information.

FIG. 8 illustrates a method of managing image presentation and viewer feedback based on scheduling information. At 800, a pair of images is received from a contributor, each pair of images depicting a different look of a related fashion aspect. At 802, the pair of images is scheduled for viewer feedback based on time information. For example, the time information can include a start time and end time (e.g., thirty seconds) in which a viewer vote or ratings must be received to continue in the feedback process. The start of the next time period for the next pair of images can be triggered based on the viewer placing a vote or a rating for a previous pair of images.

Figure 9:
FIG. 9 illustrates an exemplary user interface for voting on one of two images.

FIG. 9 illustrates an exemplary user interface (UI) 900 for voting on one of two images 902. Here, the viewer accesses a network address, as directed to by the contributor, which then presents the two images for voting on hair color for a wedding reception. Another typical scenario could be that the contributor is planning to have dinner with friends at 8 PM, but cannot decide whether to wear a shirt or a turtleneck sweater. At 7:30 PM, the contributor snaps two pictures, one with the shirt and one with the sweater, and uploads the images to a website for viewer voting (or rating). The contributor then checks back at 7:45 PM and is presented with voting information indicating that a majority of the voters (e.g., eighty versus twelve) think that the contributor looks better in the shirt for dinner with friends. Thus, the contributor can choose to wear the shirt or ignore the voting results and wear the turtle neck sweater.

Other scenarios include what glasses to buy (snap photos with different glasses in a store or wearing your friend's glasses), whether or not to dye hair (image process one version of the photo), whether to shave (e.g., a beard), or which photo would work best for an invited talk announcement, for example.

The UI 900 can also provide an option for the viewer to select images of only guys, only girls or both guys and girls. The UI 900 also provides a comments box in which the viewer enter comments related to why or why not a particular image was selected or not selected, or for the insertion of other information. A voting timer can be provided as a motivation to receive the viewer vote within a predetermined time period (e.g., thirty seconds).

The UI 900 can also provide means 910 for selecting the viewers for voting on the images. For example, the viewers can be selected based on network (e.g., intranet, social, enterprise, public, etc.), buddy lists, and/or individual users.

As illustrated, when the viewer votes (or rates) an image selection, a subsequent UI 904 is presented that presents another pair of images 906. Here, the viewer is requested to vote on a shirt color or pattern to wear for the wedding reception. This pair of image was retrieved and automatically presented in response to the viewer voting on the hair color image 902. Additionally, the UI 904 presents voting feedback 908 to the viewer for all viewers who voted on the hair color images 902.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
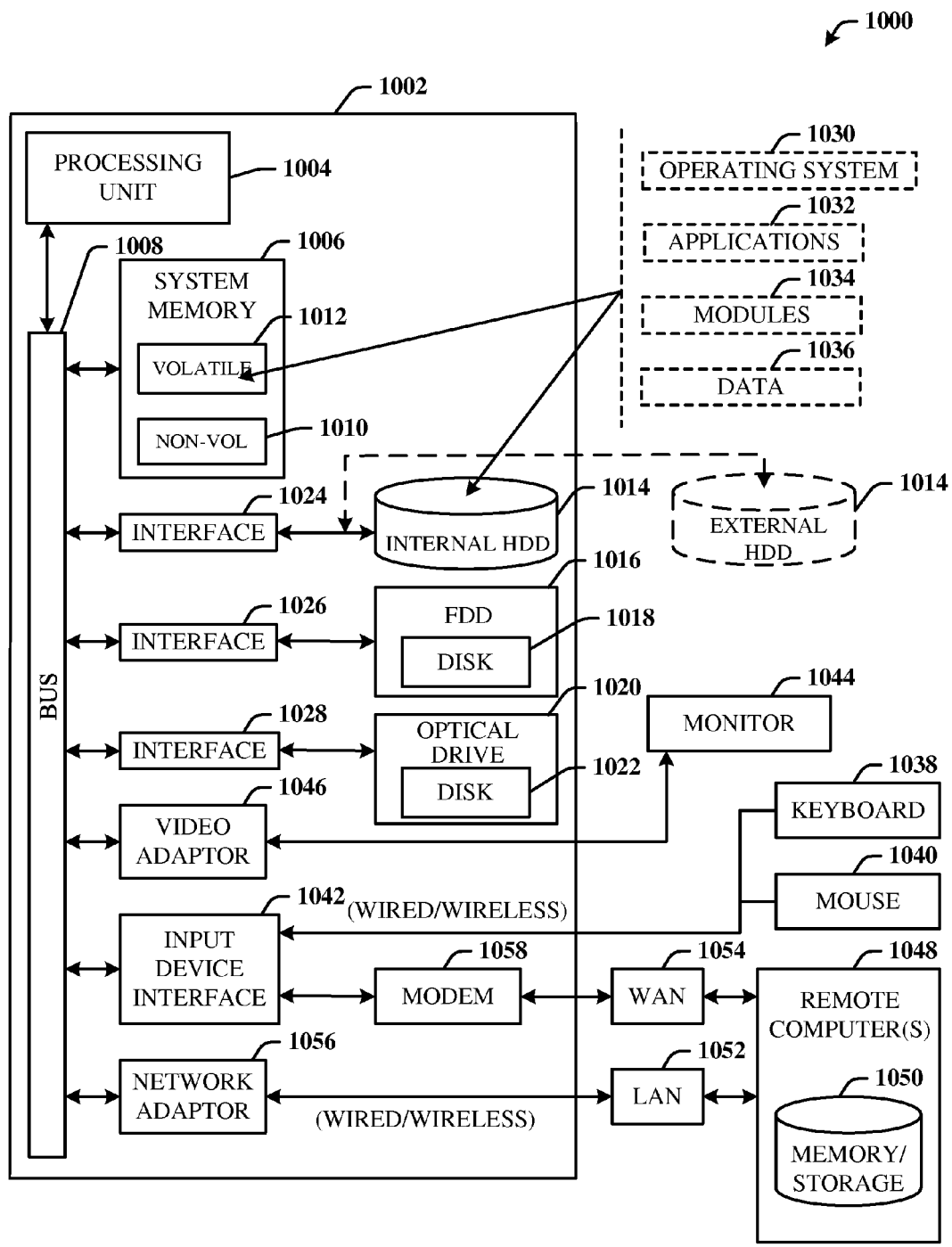
FIG. 10 illustrates a block diagram of a computing system operable to execute the disclosed feedback architecture.

Referring now to FIG. 10, there is illustrated a block diagram of a computing system 1000 operable to execute the disclosed feedback architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS contains the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. The an operating system 1030, one or more application programs 1032, other program modules 1034, and program data 1036 can include the presentation component 102, media 106, voting component 108, voting results, repository 202, authentication component 204, filtering component 206, scheduling component 208, results location component 210, results 212, enticement component 314, voice media 402, and clips 404, for example. The computer 1002 can be employed as the store or department system 312, for example, to support in-store fashion and/or cosmetic choices and opinions.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a presentation component for receiving and presenting a pair of images of a single contributor, each image depicting a different instance of personal appearance information of the contributor and including an accompanying description, each image selectable by the viewer to provide a vote;
   a voting component for receiving a vote generated by a viewer selecting one of the images indicating a voter preference for a specific instance of personal appearance information, and presenting new images of the contributor to the viewer in response to receiving the vote, the new images each depicting a new different instance of personal appearance information; and
   a processor that executes computer-executable instructions associated with at least one of the presentation component or the voting component.

2. The system of claim 1, wherein the images are differentiated by a single change in the personal appearance information.

3. The system of claim 1, wherein the different instance of personal appearance information is related to clothing worn by the contributor.

4. The system of claim 1, wherein the different instance of personal appearance information is related to a cosmetic aspect of the contributor.

5. The system of claim 1, wherein the voting component processes the vote and votes from multiple different viewers to generate overall voting results for presentation.

6. The system of claim 5, wherein the voting results are sent to a location that allows access only to the contributor.

7. The system of claim 5, further comprising a results location component for communicating the voting results to the contributor via a communications means.

8. The system of claim 1, further comprising a filtering component for limiting a number and group of users that can view the images.

9. The system of claim 1, further comprising a scheduling component for scheduling presentation of the images.

10. The system of claim 1, further comprising a repository in which the images are stored and an authentication component for managing access to the repository.

11. A computer-implemented method of providing feedback about content, comprising acts of:
    selecting and presenting a pair of images each depicting a different instance of related specific content views of a single contributor with an accompanying description to at least one viewer as part of a feedback process;
    receiving votes from the at least one viewer for one of the images indicating a viewer preference for one of the content views as part of the feedback process;
    generating and presenting voting results to the contributor as part of the feedback process;
    repeatedly selecting and presenting different instances of content views of the contributor in response to receiving votes and presenting the voting results until the feedback process terminates; and
    utilizing a processor that executes instructions stored in memory to perform at least one of the acts of selecting and presenting, receiving, generating and presenting, or repeatedly selecting and presenting.

12. The method of claim 11, wherein the images include personal appearance content and are presented in image pairs to the at least one viewer.

13. The method of claim 11, further comprising limiting size or format of the images which can be received for presentation to the at least one viewer.

14. The method of claim 11, further comprising providing immediate feedback to the at least one viewer as to accumulated statistics about the voting results.

15. The method of claim 11, further comprising limiting time that the at least one viewer can vote on the specific content views.

16. The method of claim 11, further comprising limiting viewing of the specific content views to a predetermined set of viewers.

17. The method of claim 11, further comprising notifying the at least one viewer that the images are presented for viewing.

18. The method of claim 11, further comprising optimizing viewer participation in the feedback process by providing viewer voting statistics for each of the specific content views presented.

19. A computer-implemented system, comprising:

computer-implemented means for selecting and presenting a pair of images of a single contributor to at least one viewer as submitted by the contributor, each of the series of images having different content with an accompanying description which the contributor seeks viewer feedback as part of a feedback process;

computer-implemented means for receiving votes from the at least one viewer of the series of images indicating a viewer preference for the content of one of the images as part of the feedback process;

computer-implemented means for generating and presenting voting results to the contributor as part of the feedback process;

computer-implemented means for repeatedly selecting and presenting new images of the contributor, each having different content, in response to receiving the votes and presenting the voting results, until the feedback process terminates; and processor means that executes computer-executable instructions associated with at least one of the computer-implemented means for selecting and presenting, receiving, generating and presenting and selecting and presenting.

* * * * *